(12) United States Patent
Hengel et al.

(10) Patent No.: US 6,770,835 B1
(45) Date of Patent: Aug. 3, 2004

(54) METHOD OF WELDING A CAGE AND NUT ASSEMBLY TO A WORKPIECE

(75) Inventors: James Franklin Hengel, Romeo, MI (US); David P. Kelly, Rochester Hills, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/358,132

(22) Filed: Feb. 4, 2003

(51) Int. Cl.$^7$ ............................................. B23K 11/14
(52) U.S. Cl. ...................................... 219/93; 219/117.1
(58) Field of Search ............................... 219/93, 117.1; 411/103, 104, 105, 111, 112

(56) References Cited

U.S. PATENT DOCUMENTS

| | | | | |
|---|---|---|---|---|
| 2,495,037 A | * | 1/1950 | Tinnerman | 411/112 |
| 3,219,790 A | * | 11/1965 | Johnson | 219/93 |
| 3,783,922 A | * | 1/1974 | Petrus | 411/111 |
| 4,168,795 A | * | 9/1979 | Bennett | 219/93 |
| 4,609,805 A | * | 9/1986 | Tobita et al. | 219/93 |
| 6,355,900 B1 | * | 3/2002 | Sherman | 219/117.1 |
| 6,595,732 B2 | * | 7/2003 | Werner et al. | 411/104 |

* cited by examiner

Primary Examiner—Clifford C. Shaw
(74) Attorney, Agent, or Firm—Kathryn A. Marra

(57) ABSTRACT

This invention provides a method of welding a cage and nut combination to a surface of a workpiece using a welding electrode as a holding and locating member for the cage and nut. The cage and nut are placed, upside-down, in a recess formed in the welding tip of a lower electrode which is positioned vertically with its tip up. The workpiece backed by an opposing welding electrode are positioned above the electrode holding the inverted cage. The inverted cage and workpiece are pressed together along a vertical axis and electrically welded. The lower electrode with its recess serves to accurately locate the inverted cage with its weld material projections for uniform welding contact with the surface of the workpiece for more efficient welding setup and an improved welded bond between the cage, retaining a nut, and the workpiece.

7 Claims, 1 Drawing Sheet

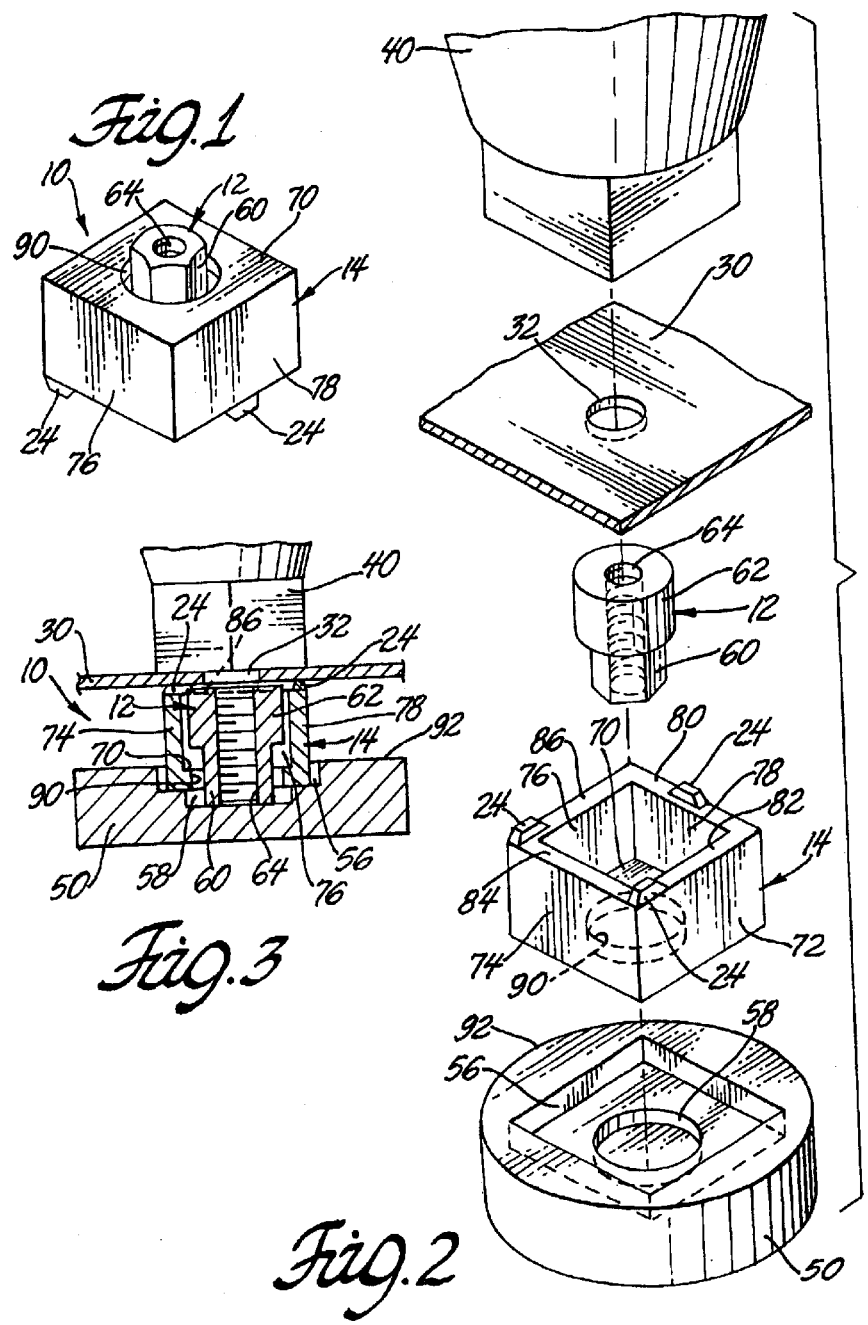

METHOD OF WELDING A CAGE AND NUT ASSEMBLY TO A WORKPIECE

TECHNICAL FIELD

This invention generally relates to a method of welding a cage and nut assembly to a metal article surface. More specifically, this invention relates to a method of welding a cage having a retained nut to a sheet metal surface by placing the cage (containing the nut) upside down in a recess in a welding electrode and locating the sheet metal and an opposing electrode over the inverted cage for welding.

BACKGROUND OF THE INVENTION

Cage and nut assemblies are commonly attached to metal components and used for bolting or otherwise joining the component to another part in an assembly. The cage with its enclosed nut is welded to, e.g., a first sheet metal component over a bolt hole in the member. Then a second component is connected to the first component with a bolt through the hole into the caged nut. Caged nut bearing components are commonly used in manufacturing applications such as in the assembly of automotive body structures.

Projection welding is a common practice for joining a cage nut to a sheet metal or other workpiece. Integral projections from the cage provide fusible metal for the weld. One or more sets of a relatively small cage and nut and the workpiece with its connector hole(s) must be suitably positioned and assembled for welding. In the present method a copper backup electrode carrying a locator pin is placed against the back side of the sheet metal with the locator pin protruding upwardly through the hole. A cage and loosely enclosed nut are placed over the locator pin with the weld projections extending from the cage resting on the sheet around the hole. A second electrode with a flat welding tip presses against the upper surface of the cage. The two electrodes are co-axially aligned and press in opposition to each other. The assembly is now ready for welding.

A controlled electrical power source delivers a pulse of high amperage AC (or rectified AC) current through the facing electrodes, the workpiece, and then to the interposed cage with its enclosed nut. Typically, a 60 Hertz welding current is applied for several cycles of electrical current application, amounting to a fraction of a second of welding time. Although the current passes through the top and sides of the cage and the region of the workpiece around the hole, the higher current density through the projections tends to selectively fuse them. When the current flow is stopped, the fused projection metal re-solidifies to weld the cage nut to the workpiece surface. The nut, while contained within the cage, does not generally participate in the welding operation. The top welding electrode and the backup electrode with its locator pin separate axially from the welded cage nut assembly and are moved to the next assembly or weld location.

In a welded cage nut to sheet metal assembly as described, the nut is held loosely with its threaded hole over the larger connector hole in the sheet metal. The nut can move laterally over the connector hole within the cage to receive a bolt or like connector during attachment of the sheet metal workpiece to another part. Depending upon how the bolted connection is to be made, the nut may be restrained from rotation by the cage structure that encloses it. Thus the nut and cage may take different but complementary shapes depending upon how they are to be used on the workpiece to which they are attached.

The above described method for assembling a cage and nut over a locator pin through the connector hole has been awkward and inefficient resulting in misaligned cages, and has sometimes produced poor welds between improperly aligned cage projections and the intended workpiece. Thus, it is an object of the present invention to provide a more efficient method of locating a cage nut assembly against a workpiece surface for a more reliable weld operation. It is a further object of the present invention to provide a method of increasing weld quality between a cage nut assembly and a workpiece by using an improved orientation of the parts of the assembly to be welded and an improved design of a welding electrode to assist in more reliably locating a cage and nut combination against a workpiece for welding.

SUMMARY OF THE INVENTION

In accordance with a preferred embodiment of the present invention, a combination of welding electrode designs is employed that permits assembly of the cage, nut and workpiece in an inverted relationship as compared to the above described prior art method. Thus, the present method contemplates that the assembly and welding operations will be carried out with upper and lower opposing welding electrodes operating along a vertical axis. Typically, the electrodes will be made of copper or suitable copper alloy for welding.

The lower electrode has an upwardly facing tip with a specially designed face. The face is generally flat with a recess for receiving a cage member that is inverted. That is, the open side of the cage, that is intended to face the workpiece, faces upwardly. The nut lies within the cage. The size and shape of the recess in the electrode is such that the cage and nut can be placed in it for suitable location of the upwardly extending cage projections of weld material. The workpiece is carried in a suitable locating fixture and positioned with its connector hole (if it has one) next to the nut. The upper electrode, which may be of conventional flat tip design, is moved axially against the back side of the workpiece (now an upper surface of the assembly). The electrodes press towards each other to urge the welding projections on the cage against the workpiece. The nut is now located below the connector hole in the workpiece and a welding current of suitable duration is passed between the electrodes through the sides of the cage, its projections and the above adjacent surface of the workpiece.

Placing the cage and nut upside down in the recessed electrode suitably locates the cage on the axis of the welding operation. The shape of the recess is complementary with the upper surface of the cage so that its welding projections are properly positioned for engagement with the workpiece surface. The workpiece will ordinarily be separately supported and, at some point in the assembling of the parts for welding, moved along the axis of the welding electrodes against the cage projections for the welding operation.

After welding, the cage with its retained nut is, of course, attached to the workpiece. The electrodes are separated axially and the workpiece moved from the welding setup by its locating and support means.

Industrial processes that employ cage nuts for the assembly of parts rely on efficient and inexpensive assembling and welding methods and, most importantly, high weld quality. Weld quality is significantly increased by establishing and maintaining alignment of the cage with its retained nut and the workpiece for the welding process. The method of the present invention permits efficient and robust positioning of the cage, nut and workpiece.

These and other objects and advantages of this invention will become apparent from a detailed description of a preferred embodiment that follows.

BRIEF DESCRIPTION OF THE DRAWINGS

FIG. 1 is an oblique top view of a cage with a retained nut representative of a cage nut assembly for use in the present invention.

FIG. 2 is an oblique exploded view of the cage, retained nut, workpiece, and welding electrodes demonstrating the assembly of these parts for welding.

FIG. 3 is a side view, partly in section, showing the retained nut located for welding in a recess formed in the tip of the lower welding electrode.

DESCRIPTION OF A PREFERRED EMBODIMENT

This invention provides a method of positioning and welding a cage nut assembly (i.e., a cage with a retained nut) to a surface of a metal sheet or other workpiece. This invention also provides a design of a welding electrode, for aligning the cage nut with the workpiece at a predetermined welding spot. The method and design features of the present invention assure proper positioning for good electrical contact between the welding surfaces of the cage and the workpiece. Further, these method and electrode design features permit efficient and reliable location of the cage, retained nut and workpiece for welding.

A cage and nut design for illustration of the practice of this invention is shown in FIG. 1. Cage and nut assembly 10 comprises a nut 12 and cage 14. Cage and nuts are used in a wide variety of shapes. In many instances a cage and nut combination are shaped so that the nut can be translated laterally within a cage but not rotated. In such case when the cage with a retained nut is welded to a workpiece, a bolt is inserted through the connector hole in the workpiece and torqued into the non-rotatable nut. In other cases it may be intended that the nut be rotatable within its cage. This case is illustrated in the following description. However, as will be seen, the practice of the invention will not normally depend on the structural relationship between the nut and cage.

In the illustration of FIG. 1, cage 14, with retained nut 12, are positioned as they might normally be observed when attached to a workpiece, not shown. Cage 14 is a rectangularly shaped housing element for nut 12. Nut 12 has a cylindrical body portion 62 and a smaller diameter hexagonal head portion 60 (see FIGS. 1–3). Nut 12 has a threaded hole 64 through both body portion 62 and head portion 60 for receiving a bolt, not shown. Cage 14 has a square base 70 to which are attached four side walls 72, 74, 76, 78. The base 70 and four walls 72, 74, 76 and 78 enclose the body portion 62 of nut 14 but do not prevent it from rotation. As stated, cages and nut can have other shapes and functions.

Base 70 of cage 14 comprises a central hole 90 through which the head portion 60 of nut 12 extends. Hole 90 is larger than the hexagonal head 60 of nut 12 so that the nut can move laterally within cage 14 and so that, in this example, a wrench can be applied to head 60 in a bolting operation.

As shown in FIG. 2, side walls 72, 74, 76 and 78 of cage 14 comprise end surfaces 80, 82, 84, 86. At least one of these end surfaces comprises an underlying projection 24 (three shown in FIG. 2). Walls 72 and 76 are spaced apart by a distance that is substantially greater than the diameter of cylindrical body 62 of nut 12. Furthermore, each wall comprises a length, from top to bottom, which is greater than the length of body portion 62. Thus, nut 12 is translatable and rotatable within cage 14. The loose fit between nut 12 and cage 14 allows nut 12 to suitably move within cage 14 to receive a bolt as will be described.

Preferably, projections 24 are formed integrally with end surfaces 80, 82, 84, 86 and they provide welding metal of the same material as that of cage nut assembly 10. Projections 24 are suitably sized and shaped in a known manner to provide sufficient weld metal at suitable locations for the attachment of cage 14 and retained nut 12 to a workpiece such as workpiece 30 (FIGS. 2 and 3).

Weld quality often depends on suitable contact area of projections 24 to workpiece 30 for passage of the electrical current. As a means for increasing this area, projections 24 can be provided having an oblong, or quadrilateral side profile, as seen in FIG. 2. The projections may be tapered as they extend from the cage toward their contact edge with the workpiece surface. Since projections 24 provide welding current contact between cage 14 and workpiece 30, they are suitably shaped to be heated by the weld current and quickly fuse to provide the desired robust connection between cage 14 and workpiece 30.

An object of this invention is to provide a method for efficient and accurate location of cage 14 and nut 12 against workpiece 30 for welding. As seen in FIGS. 2 and 3, the cage 14 and nut 12 are inverted for this step. The welding operation is to be performed by lower and upper opposing copper electrodes aligned in a vertical axis as shown in FIGS. 2 and 3. The tip portion 40 of the upper electrode is shown to be flat for good pressing engagement with the workpiece 30. In this example, tip 40 is aligned with connector hole 32. Connector hole 32 is usually oversized with respect to a bolt to be inserted (not shown) and bolt hole 64 in nut 12. As is known this facilitates later attachment of another part to workpiece 30.

Tip portion 50 of the lower welding electrode is shown. The design of this tip portion 50 simplifies location and assembly for the cage 14 and nut 12 for welding to workpiece 30.

The design of lower electrode tip 50 is shown in FIG. 2. Specifically, the lower electrode locates cage nut assembly 10 by receiving cage 14 in a pocket, or recess, 56 formed in flat surface 92 of the electrode tip 50. This pocket 56 is generally adapted to receive inverted cage 14 of cage nut 10 such that contact surfaces 80, 82, 84, 86 of cage nut assembly 10 will lie in proper alignment with predetermined welding areas on workpiece 30. Pocket 56 is sized and shaped to receive cage 14 in a suitable fit for proper alignment throughout the welding process. When the inverted cage 14 and nut 12 are placed in recess 56 the electrode is located on, or movable to its axis of movement for welding cage 14 to workpiece 30.

It is recognized that an electrode tip 50 may be used in the welding of cage nut assemblies of different sizes and shapes. Thus, a pocket 56 may be sized to receive the largest cage, and inserts then prepared for placing in recess 56 to securely receive smaller cages. These adjustable inserts can be attached to recess 56 by any suitable means. Preferably, however, these inserts can simply be slipped snugly inside electrode tip recess 56.

In accordance with the present invention, electrode tip 50 can also comprise a second recess 58 formed within recess 56 for receiving head portion 60 of cage nut assembly 10. The purpose of recess 58 is to provide a clearance gap between nut 12 and electrode 50, while cage nut assembly 10 is being welded to workpiece 30. Nut head recess 58 may also be adapted to receive adjustable inserts (not shown) where each insert is, now, sized and shaped to accommodate a specific head 60 design of nut 12. These adjustable inserts can be attached to pocket 58 by any suitable means, such as snapping or screwing. Preferably, however, these inserts can simply be dropped inside pocket 58, without having to attach it to the pocket.

In reference to FIG. 3, the method of the present invention involves aligning cage and nut assembly 10 with a flat surface of workpiece 30 by inverting cage 14 and nested nut 12 and placing the cage 14 in pocket 56 of electrode 50 with side walls 72, 74, 76 78 aligned vertically and projections 24 on top of the assembly pointing upwardly. Head portion 60 of nut 12 fits in recess 58. Electrode with tip 50 is secured in a suitable conventional welding apparatus, not shown, and positioned upright as described for welding.

Workpiece 30 is placed in a suitable locating and holding fixture for the welding operation. The workpiece is held in a generally horizontal attitude with its connector hole 32 centered over the tip 50 of the lower welding electrode and the cage/nut assembly 10 that it now carries. Upper electrode with its tip 40 engages the backside of workpiece 30 overlying connector hole 32. The opposing electrodes are actuated to press the workpiece 30 surface against projections 24 on cage 14 for the effective passage of welding current.

The welding apparatus produces a suitable controlled pulse of, for example, AC welding current between and through electrode tip 40 and electrode tip 50. The current flows in cage 14, including projections 24 and the adjacent surface of workpiece 30 around hole 32. The metal, for example aluminum alloy or steel, in projections 24 fuses. Fusion of adjacent metal in workpiece 30 may also occur. The pressure exerted by and between electrodes maintains cage 14 to workpiece 30 contact throughout this welding operation. Within a fraction of a second or so the welding current is stopped. The fused metal loses heat to the massive workpiece 30 and solidifies to complete the weld between cage 14 and workpiece 30.

Nut 12 does not significantly participate in the welding operation and is unaffected by it except that it is now fully contained within cage 14 against workpiece 30 overlying connector hole 32. Later when a second part is to be attached to workpiece 30, the two members are positioned together. Then, for example, a bolt is inserted through the attaching piece and connector hole 32 of workpiece 30. Nut 12 can move, or be moved, to receive the bolt. In this example, a wrench can be applied to head 60 to tighten the nut on the bolt in the attachment of the pieces.

The nut 12, cage 14 and workpiece 30 are usually, but not necessarily, formed of like metals. In the automotive industry, for example, the materials for welding are typically steels or aluminum alloys. As indicated the shape of the cage and nut may take many different forms. The general requirement for the practice of this method is only that the cage shape be capable of being inverted and nested in the recess of an upwardly positioned welding electrode. The nut rests within the cage in a manner depending upon the relative shapes of the nut and cage. The welding surface(s) of the cage is thus positioned uppermost for suitable welding engagement with a workpiece located above the electrode and cage/nut assembly. Accordingly, while the invention has been described in terms of a preferred embodiment, it is not intended to be limited to that description, but rather only to the extent of the following claims.

What is claimed is:

1. A method of welding a cage having a retained nut to a location on a workpiece surface, said cage comprising a base and one or more side members for retaining said nut, at least one of said side members comprising a projection of welding material for fusion against said workpiece surface during said welding, said welding method comprising the use of a lower welding electrode and an upper welding electrode, said electrodes being movable along a vertical axis between (i) an open position for placement of said cage, retained nut and workpiece between said electrodes and (ii) a closed position for pressing said cage and workpiece into contact for said welding, said method comprising the steps of:

placing said cage, base down with said retained nut, in a recess in the upper end of said lower welding electrode when said electrodes are in said open position, said recess being complementary in shape to said base and side members so as to locate said cage for said welding with said welding material projection(s) upward for welding contact with said workpiece surface;

locating said workpiece between said electrodes with said location on said workpiece surface being on said vertical axis overlying said cage;

moving said electrodes to said closed position to press said projection(s) against said workpiece at said surface location;

passing an electrical welding current between said electrodes and through said projection(s) for a time sufficient to fuse said projection material against said workpiece surface; and stopping the electrical current to permit the fused material to solidify and form said weld.

2. A method as recited in claim 1 in which said location on said workpiece comprises a connector hole at said location and said location with said hole is located on said vertical axis overlying said cage.

3. A method as recited in claim 1 in which said lower welding electrode is adapted for welding said cages of different sizes, said electrode comprising a recess sized and shaped for placement of the largest of said cages, said method comprising, when a smaller said cage is to be welded, placing an insert member in said recess, said insert being complementary in shape to said smaller cage.

4. A method as recited in claim 1 in which said retained nut comprises a body portion and a head portion, said head portion extending through an opening in said base of said cage when said nut is retained in said cage.

5. A method as recited in claim 4 in which said lower welding electrode comprises a nut receiving recess for receiving said head portion of said nut when said cage is placed in said electrode.

6. A method as recited in claim 1 wherein said welding material projection has a profile that becomes smaller in a direction toward said workpiece surface.

7. A method as recited in claim 6 wherein said profile is triangularly or quadrilaterally shaped.

* * * * *